US010268310B2

(12) United States Patent
Zhang et al.

(10) Patent No.: US 10,268,310 B2
(45) Date of Patent: Apr. 23, 2019

(54) INPUT METHOD AND ELECTRONIC DEVICE THEREOF

(71) Applicant: Lenovo (Beijing) Co., Ltd., Beijing (CN)

(72) Inventors: Xiaoping Zhang, Beijing (CN); Chunlong Yang, Beijing (CN); Lu Cao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/582,867

(22) Filed: May 1, 2017

(65) Prior Publication Data

US 2017/0315663 A1   Nov. 2, 2017

(30) Foreign Application Priority Data

Apr. 29, 2016   (CN) .......................... 2016 1 0285504

(51) Int. Cl.
*G06F 3/041*   (2006.01)
*G06F 3/0488*   (2013.01)

(52) U.S. Cl.
CPC .......... *G06F 3/0416* (2013.01); *G06F 3/0414* (2013.01); *G06F 3/04886* (2013.01)

(58) Field of Classification Search
CPC ... G06F 3/0416; G06F 3/0414; G06F 3/04886
USPC ........................................................ 345/174
See application file for complete search history.

(56) References Cited

U.S. PATENT DOCUMENTS

| 2003/0206157 | A1* | 11/2003 | Emerson | G06F 3/04895 345/168 |
| 2011/0018695 | A1* | 1/2011 | Bells | G06F 3/016 340/407.2 |
| 2011/0050628 | A1* | 3/2011 | Homma | G06F 3/0236 345/174 |
| 2013/0076595 | A1* | 3/2013 | Sirpal | G06F 3/1438 345/1.3 |
| 2015/0007088 | A1 | 1/2015 | Itoh et al. | |

FOREIGN PATENT DOCUMENTS

| CN | 102393793 A | 3/2012 |
| CN | 103186339 A | 7/2013 |
| CN | 104915140 A | 9/2015 |
| CN | 105446646 A | 3/2016 |
| CN | 105511784 A | 4/2016 |

* cited by examiner

*Primary Examiner* — Mark Edwards
(74) *Attorney, Agent, or Firm* — Anova Law Group, PLLC

(57) ABSTRACT

An input method is provided. The method includes receiving a touch operation in a first region of a touch screen, the first region corresponding to an input region of a virtual input unit; measuring a pressure of the touch operation; determining a first input key corresponding to a location of the touch operation; and determining an instruction corresponding to the touch operation based on the measured pressure and the first input key.

7 Claims, 3 Drawing Sheets

INPUT METHOD AND ELECTRONIC DEVICE THEREOF

CROSS-REFERENCES TO RELATED APPLICATIONS

This application claims priority of Chinese Patent Application No. 201610285504.1, filed on Apr. 29, 2016, the entire content of which is hereby incorporated by reference.

FIELD OF THE INVENTION

The present disclosure generally relates to the field of electronics technologies and, more particularly, relates to a computer system input method and an electronic device thereof.

BACKGROUND

As the technology development moves forward and the competition in the electronics market intensifies, the functions and industry designs of the electronic devices have improved significantly. Laptop computers have become smaller, lighter, more mobile, and have more entertainment features. As such, consumers routinely use light laptops for many functions.

Another trend is the prevalence of flexible display panels. Laptops with flexible display panels have become popular. Such laptops often use one display panel to present all information, including a virtual keyboard and related information. In practice, when using a virtual keyboard to input information, because the users do not have a proper sense of touch, it is easy to mistype keys. This is especially true for using combination keys. In some cases, the virtual keyboard may not include certain combination keys, such as ctrl keys or shift keys. This type of set up would make it even more difficult for a user to input certain information. For example, when a user wants to enter a capitalized letter, he often needs to switch to a capitalized key input mode. Alter the user types in the capitalized letter, he may then need to switch to an un-capitalized input mode. As a result, the corresponding keyboard input may be difficult and less efficient.

BRIEF SUMMARY OF THE DISCLOSURE

A first aspect of the present disclosure provides an input method. The method includes receiving a touch operation in a first region of a touch screen, the first region corresponding to an input region of a virtual input unit; measuring a pressure of the touch operation; determining a first input key corresponding to a location of the touch operation; and determining an instruction corresponding to the touch operation based on the measured pressure and the first input key.

Another aspect of the present disclosure provides an input device. The input device includes a touch screen, the touch screen displaying a virtual input unit in a first region, the first region corresponding to the input region of the virtual input unit; and a processor, the processor receiving input operations from the first region, measuring a pressure of the touch operation; determining a first input key corresponding to a location of the touch operation; and determining an instruction corresponding to the touch operation based on the measured pressure and the first input key.

Another aspect of the present disclosure provides a computer-readable medium including contents that are configured to cause a computing system to receive input by performing a method. The method includes receiving a touch operation in a first region of a touch screen, the first region corresponding to an input region of a virtual input unit; measuring a pressure of the touch operation; determining a first input key corresponding to a location of the touch operation; and determining an instruction corresponding to the touch operation based on the measured pressure and the first input key.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to certain embodiments of the invention, which are illustrated in the accompanying drawings. Wherever possible, the same reference numbers will be used throughout the drawings to refer to the same or like parts. The described embodiments are some but not all of the embodiments of the present invention. Based on the disclosed embodiments and without inventive efforts, persons of ordinary skill in the art may derive other embodiments consistent with the present disclosure, all of which are within the scope of the present invention.

In the present disclosure, an electronic device may be a personal computer (PC), a notebook computer, a tablet computer (PAD), a mobile phone or a smartphone, and other electronic devices with similar functions.

Further, in the present disclosure, the electronic device may include a touch screen display. The touch screen display can show various images, such as an application interface, images from a local computer or from a cloud server, video stream data, etc. In various applications, the touch screen may enable the user to touch the symbols or letters on the screen to operate the electronic device. This reduces or eliminates the need of a mouse device or a physical keyboard, which makes the human computer interactions more direct.

In the present disclosure, the electronical device may include an input unit. A user may use the input unit to enter symbols or letters. For example, a user may enter the user ID and password to login a system. Further, in the present disclosure the input unit may be a virtual input unit, such as a virtual keyboard. The virtual input unit may be displayed on the touch screen. The user may input information through the virtual input unit displayed on the touch screen, and to operate the electronic device using the virtual input unit.

In the present disclosure, "and/or" refers to a logical relationship. The term "and/or" may be used to indicate that two associated objects may have three types of relations. For example, "A and/or B" may represent three situations: A exclusively exists, A and B coexists, and B exclusively exists. In addition, the character "/" may be used to indicate an "exclusive" relation between two associated objects.

Below are a few embodiments of the present disclosure.

Figure 1:
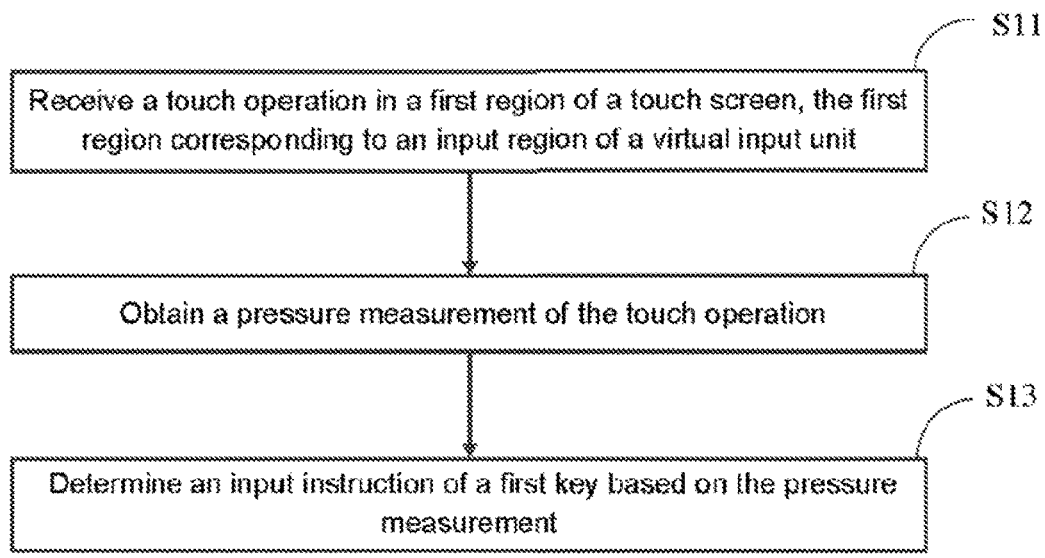
FIG. 1 illustrates a flow chart of an input method consistent with the disclosed embodiments.

FIG. 1 illustrates a method for inputting information with the following steps.

In step S11, the electronic device may receive a touch operation from a first region of a touch screen. The first region may correspond to the input region of the virtual input unit of the electronic device.

In the present disclosure, the first region may be a pre-set region on the touch screen. For example, the first region may be a region along the bottom line of the touch screen. In another example, the first region may be located in the middle of the touch screen, etc. In various embodiments, the first region may be the region corresponding to the virtual input unit of the electronical device. For example, the virtual input unit may be a virtual keyboard.

A touch operation may refer to a user using an operating tool, such as a pen or his finger, to operate the device using the touch screen. For example, when a user enters a touch operation, the operation may refer to the finger touch motion applied on the touch screen, which can be received and can operate, for example, the virtual keyboard. For example, the user may push down or click on a virtual key on the virtual keyboard displayed in the first region.

In step S12, the electronical device may take a measurement of the pressure of the touch operation. In the present disclosure, after the electronic device determines that that it has received a touch operation input from the virtual input unit, the device measures the pressure of the touch operation. For example, the electronic device may use a pressure sensor to measure the pressure applied in the touch operation. In other embodiments, the electronical device may use other sensors or components to measure the pressure of the touch operation.

In some embodiments, the electronic device may determine the position of the touch operation on the touch screen. Based on the position data, the electronic device may determine a first input key of the virtual input unit.

The position data may include data indicative of the position at which the user touches the touch screen, such as the coordinates of the touch position. The electronic device may implement capacitive touch or resistive touch technologies to receive and/or determine touch positions.

In some embodiments, the touch screen may display a virtual input unit, such as a virtual keyboard, on the screen. The input keys on the virtual input unit are displayed at certain positions on the touch screen. As such, certain positions on the touch screen correspond to certain input keys. As such, by determining the position of the touch operation on the touch screen, the electronic device may determine the input key being pressed on or clicked on by the user.

In some embodiment, a virtual input unit may include multiple virtual input keys. Every virtual input key may correspond to a letter, a number, a punctuation, an input key, etc. In some embodiments, the first input key may be a virtual key for a letter on the virtual input unit. For example, the virtual input unit may include virtual keys corresponding to letters A, B, C, Z (or a-z). These virtual keys may be referred to as input keys. In some embodiments, a user may press a virtual key corresponding to a letter and input the letter into the electronic device.

In some embodiments, when a virtual keyboard is set in the capitalized letter mode, a user may type the virtual key corresponding to the letter "A." The letter "A" may be typed into the electronic device. When a virtual keyboard is set in the non-capitalized letter mode, a user may type the virtual key corresponding to the letter "a." The letter "a" may be typed into the electronic device.

Similarly, a user may press or click on other virtual keys to input the characters corresponding to the virtual keys. The input method is similar to what is described above, and is not repeated herewith.

In step S13, the electronic device determines the input based on the input key triggered by the touch operation of the virtual input unit.

In some embodiments, a virtual key of the virtual input unit may correspond to certain input instructions. Once a user input one instruction, he can input the letter or input key. For example, a virtual key for letter "C" (or "c") in the virtual input unit can be used to enter a capitalized "C," a lowercase "c," or an instruction corresponding to the "Ctrl+C" input key.

In some embodiments, before step S13, after determining the first input key corresponding to the touch operation, based on the virtual input unit, the electronic device may determine two or more input instructions that correspond to the first input key. The electronic device may first determine the current input mode. Based on the current input mode, the device may determine the two or more input instructions.

In some embodiment, the virtual input unit may include a first input mode and a second input mode. Under each of the first and second input mode, one input key of the virtual input unit may correspond to two or more input instructions. Under each input mode, the two or more input instructions may have different priority levels.

For example, the first input mode may be a capitalized input mode; and the second input mode may be a lowercase input mode. In another example, the first input mode may be a lowercase input mode; and the second input mode may be a capitalized input mode.

In some embodiments, the electronic device may have the first input mode, the second input mode, or another input mode, such as an intelligent pinyin input mode, a five-stroke input mode, etc. In some embodiments, the virtual input unit may have an un-capitalized lowercase input mode. The user may press the virtual key corresponding to a letter or a symbol, such as pressing the virtual key for the letter "r," to enter the letter "r." The electronic device may display the letter accordingly.

Figure 2A:
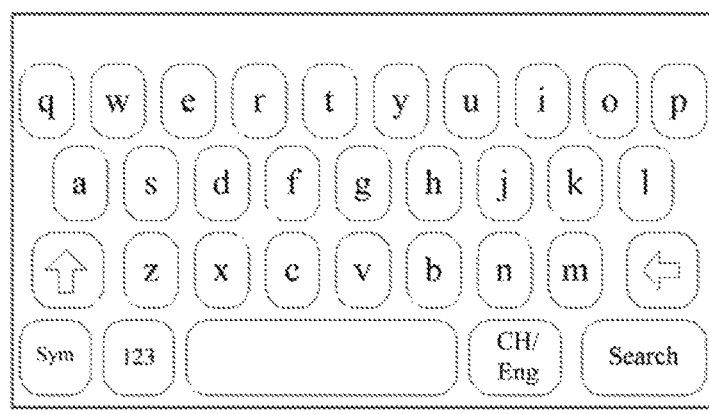
FIGS. 2A-2B illustrate examples of input keyboards consistent with the disclosed embodiments.
Figure 2B:
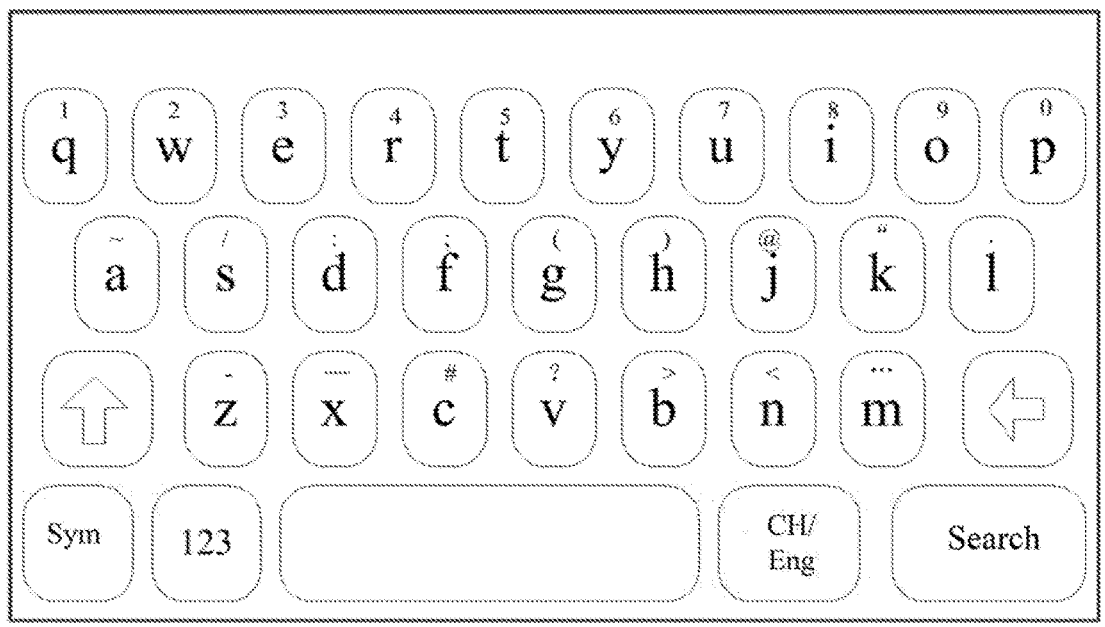

In some embodiments, a virtual key of the virtual input unit may correspond to other symbols. As shown in FIG. 2B, on the virtual keyboard shown on a touch screen, the virtual keys on a virtual keyboard correspond to letters as well as numbers or punctuations. The default input from the virtual keys may be the letters marked on the virtual keys. When the virtual input is set in the capitalized input mode, the input from the virtual keys may be the capitalized version of the letters marked on the virtual keys.

In some embodiments, under different input modes, of the two or more input instructions, the instruction that corresponds to the currently selected input mode is identified as the priority input instruction. For example, the current input mode may be the capitalized input mode, comparing to the input instruction for inputting a lowercase letter, the input instruction for inputting the capitalized letter marked on the virtual key is then the priority input instruction. That is, if a user presses the virtual key, the electronic device will first select or execute the instruction for inputting the capitalized letter. Similarly, if the current input mode is the un-capitalized lowercase input mode, the electronic device may first select or execute the instruction for inputting the lowercase letter.

In some embodiments, the use scenarios for having two or more input instructions based on the input key pressed in different input modes can be described as follows.

In the first scenario, the input mode of the virtual input unit may be the first input mode. Of the two input instructions, under a first display mode, the first input key may correspond to the first input instruction. Under a second display mode, the first input key may correspond to the second input instruction.

In the second scenario, the input mode of the virtual input unit may be the second input mode. Of the two input instructions, under the second display mode, the first input key may correspond to the first input instruction. Under the first display mode, the first input key may correspond to the second input instruction.

In some embodiments, the displayed letter and symbols refer to the letters and symbols corresponding to the virtual keys of the virtual input unit (e.g., virtual keyboard). The letters and symbols entered also correspond to the present input mode. For example, under a default input mode, the virtual keys of the virtual input unit correspond to the lowercase letters and symbols. The displayed letters are lowercase letters and the corresponding symbols. When the input mode is the capitalized input mode, the virtual keys correspond to the capitalized letters and symbols. The electronic device may then display capitalized letters and symbols. For example, the virtual key may correspond to capitalized letter "F." The electronic device may therefore display capitalized letter "F."

In some embodiments, if an input key corresponds to a displayed lowercase letter, then the first input mode may be the un-capitalized lowercase input mode. The second input mode may be the capitalized input mode. The first display mode may correspond to an un-capitalized lowercase display mode. The second display mode corresponds to a capitalized display mode. Alternatively, if an input key corresponds to a displayed capitalized letter, then the first input mode may be the capitalized input mode. The second input mode may be the un-capitalized lowercase input mode. The first display mode corresponds to a capitalized display mode. The second display mode corresponds to an un-capitalized lowercase display mode.

In some embodiments, a displayed character may correspond to a combination of keys. For example, for an input key for letter "A" (or "a"), under one input mode, the input key may correspond to a combination key "Ctrl+A," which corresponds to a function of selecting all content. For an input key for letter "B" (or "b"), the input key may correspond to a combination key "Ctrl+B," which corresponds to a function of bold font format.

In some embodiment, the step S13 may include the following steps. First, the electronic device may determine whether a user's finger pressure applied on the touch screen is more than a threshold value. If the pressure is not more than the threshold value, the electronic device may determine the pressed first input key corresponds to a first input instruction. If the pressure is equal to or more than the threshold value, the electronic device may determine the pressed first input key corresponds to a second input instruction. The first input instruction and the second input instruction are different. The first input instruction and the second input instruction may correspond to letters or symbol marked on the first input key.

In some embodiments, the pressure threshold value may be set when the electronic device is manufactured. The pressure threshold value may also be set by a user. In another example, the electronic device may set and adjust the pressure threshold values based on user's operating habit. For example, if a user often applies heavy pressure to the virtual input unit, the electronic device may set the pressure threshold value to a higher value.

In some embodiments, the electronic device may determine whether a user's finger pressure applied on the touch screen is less than a threshold value. If the pressure is less than the threshold value, the electronic device may determine that the user operation is in a light-touch mode. The electronic device may take the input instruction with the higher priority, which may be the first input instructions. The electronic device may then input and display the character corresponds to the first input instruction.

In some embodiment, when the virtual keyboard is in the un-capitalized lowercase input mode, the first input instruction may be an instruction for inputting a lowercase letter. The second input instruction may be an instruction for inputting a capitalized letter, or may be an instruction for inputting an input key instruction. The pressure threshold may be 4N. When a user presses the virtual key for "a" on the virtual keyboard displayed on the touch screen, if the electronic device determines that the pressure applied is 3.3N, which is lower than the threshold value, the electronic device may determine that the first instruction is the instruction with the higher priority, i.e., the instruction for inputting the lower case character "a."

If the electronic device determines that the applied pressure is greater than the threshold value, it may determine that the user presses the virtual keys with high pressure. The electronic device may execute the second input instruction with a lower priority.

In the above example, the determined pressure is 5N, which is greater than the threshold value. This means the user presses virtual keys with more power. The electronic device may execute the second input instruction with a lower priority, i.e., to input the capitalized character "A." Alternatively, the electronic device may input other functional key, such as "Ctrl+A," which selects all content of the current page.

In some embodiments, through determining the pressure applied to the touch screen during the input operation, the electronic device determines the corresponding input letter or input key. As a result, the electronic device may display the proper letter or execute the proper input key. The virtual keyboard thus incorporates 3D touch technologies. The users may therefore have improved user experience for the input operations.

In some embodiments, when the virtual input unit is in the un-capitalized lowercase input mode, a light-touch by the user means the electronic device will input lowercase letters. A heavy-touch by the user means the electronic device will input capitalized letters. When the virtual input unit is in the capitalized input mode, a light-touch by the user means the electronic device will input capitalized characters. A heavy-touch by the user means the electronic device will input lowercase characters. That is, when user applies a light-touch, the electronic device will input the characters according to the current input mode. When a user applies a heavy-touch, the electronic device will input characters according to the non-selected input mode or as combination input keys. That is, if a user applies high pressure (heavy-touch) on "C" (or "c"), the electronic device may execute the "Ctrl+C" function; if a user applies high pressure (heavy-touch) on "X" (or "x"), the electronic device may execute the "Ctrl+X" function; if a user applies high pressure (heavy-touch) on "Z" (or "z"), the electronic device may execute the "Ctrl+Z" function. Thus, the user may input the combination input keys through the virtual keyboard. This improves the functionality of the virtual keys, which in turn improves the efficiency of the input operations.

By incorporating the 3D Touch technologies into the virtual input keys, a user can switch the display of the input character, e.g., from lowercase to capitalized letters, without needing to press extra input keys. This improves the efficiency of the user input operations and reduces typing errors. In addition, a user may press one virtual key to input a combination input key, this improves the functionality of the virtual keyboard. This design also improves the user experience during the input operations.

Figure 3:
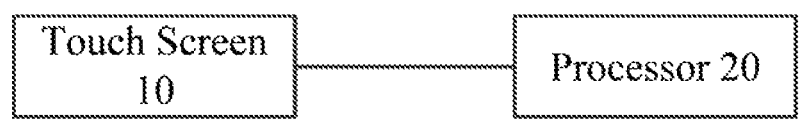
FIG. 3 illustrates a structural diagram of an electronic device consistent with disclosed embodiments.

As shown in FIG. 3, the present disclosure provides an electronic device. The electronic device may include a touch screen 10 and a processor 20.

The touch screen 10 may display a virtual input unit in the first region. The first region therefore corresponds to the virtual input unit. The user may touch the first region on the touch screen to implement input operations though the virtual input unit. The virtual input unit may be a virtual keyboard. The virtual keyboard may include multiple virtual keys, each virtual key corresponding to one or more characters or letters.

The processor 20 is connected to the touch screen 10. The processor 20 may receive the input operation from the touch operations applied in the first region. The processor 20 may determine the pressure applied during the input touch operations. Based on the determined pressure, the processor 20 may determine the input instruction corresponding to the first input key pressed during the input touch operation.

The processor 20 may further execute the following steps. First, the processor 20 may determine whether a user's finger pressure applied on the touch screen is more than a threshold value. If the pressure is not more than the threshold value, the processor 20 may determine the pressed first input key corresponds to a first input instruction. If the pressure equals to or more than the threshold value, the processor 20 may determine the pressed first input key corresponds to a second input instruction. The first input instruction and the second input instruction are different instructions. The first input instruction and the second input instruction may correspond to letters or symbol marked on the first input key.

The processor 20 may execute the following steps. Before determining the first input key corresponding to the touch operation, based on the virtual input unit, the processor 20 may determine two or more input instructions that correspond to the first input key. The processor 20 may first determine the current input mode. Based on the current input mode, the processor 20 may determine the two or more input instructions. In some embodiment, the virtual input unit may include a first input mode and a second input mode. Under each of the first and second input modes, one input key of the virtual input unit may correspond to two or more input instructions. Under each of the two input modes, the two or more input instructions may have different priority levels.

The processor 20 may further execute the following steps: determine that the virtual input unit is in the first input mode; determine that one input instruction under the first input mode is an input instruction to display the first input key in a first display mode; determine a second input instruction under the first input mode is an input instruction to display the first input key in a second display mode. The processor 20 may further determine that the virtual input unit is in the second input mode; determine that one input instruction under the second input mode is an input instruction to display the first input key in a second display mode; and determine a second input instruction under the first input mode is an input instruction to display the first input key in a first display mode.

The processor 20 may execute the following steps; determine a first input key corresponding to a location of the touch operation; and determine an input instruction based on the measured pressure and the first input key.

Figure 4:
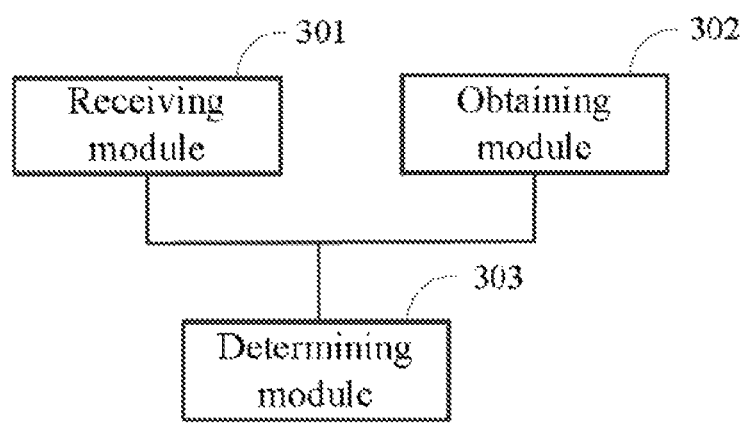
FIG. 4 illustrates a block diagram of an electronic device consistent with disclosed embodiments.

As shown in FIG. 4, the present disclosure provides an electronic device including a receiving module 301 an obtaining module 302 and a verification module 303.

The receiving module 301 may receive the input operation through the first region of the touch screen. The first region corresponds to the input region of the virtual input unit of the electronic device.

The obtaining module 302 may obtain a pressure measurement of the input touch operation.

The determining module 303 may determine the input instruction inputted by the first input key of the virtual input unit based on the obtained pressured measurement.

The determining module 303 may determine whether the measured pressure is higher than a threshold value. If the measured pressure is, lower than the threshold value, determining that the first input key corresponds to a first input instruction; if the measured pressure equals to or is higher than the threshold value, determining that the first input key corresponds to a second input instruction. The first input instruction is different from the second input instruction and the first and the second input instructions correspond to the first input key.

The determining module 303 may determine an input mode of the virtual input unit; and determine input instructions associated with the first input key based on the input mode. The virtual, input unit includes a first input mode and a second input mode; under each input mode, an input key of the virtual input unit corresponds to two or more input instructions, each input instruction having a different priority level.

The determining module 303 may determine that the virtual input unit is in the first input mode; determine that one input instruction under the first input mode is an input instruction to display the first input key in a first display mode; determine a second input instruction under the first input mode is an input instruction to display the first input key in a second display mode; determine that the virtual input unit is in the second input mode; determine that one input instruction under the second input mode is an input instruction to display the first input key in a second display mode; and determine a second input instruction under the first input mode is an input instruction to display the first input key in a first display mode.

In some embodiments, the obtaining module 302 may determine a first input key corresponding to a location of the touch operation; and determine an input instruction based on the measured pressure and the first input key. It should be appreciated that all sorts of instructions, and not just input instructions, could be envisaged for the embodiments.

In some embodiments, the input method of the present disclosure may be implemented by computer programs stored on various hard disks, flash drives, and other computer readable medium. When the computer programs are executed by one or more processors, the computer instructions may perform the following steps.

The computer programs stored in computer readable medium may be executed by one or more processors to: receive a touch operation in a first region of a touch screen, the first region corresponding to an input region of a virtual input unit; measure a pressure of the touch operation;

determine a first input key corresponding to a location of the touch operation; and determine an input instruction based on the measured pressure and the first input key.

Further, the computer programs stored in computer readable medium may be executed by one or more processors to: determine whether the measured pressure is higher than a threshold value. If the measured pressure is lower than the threshold value, determining that the first input key corresponds to a first input instruction; if the measured pressure equals to or is higher than the threshold value, determining that the first input key corresponds to a second input instruction. The first input instruction is different from the second input instruction and the first and the second input instructions correspond to the first input key.

Further, the computer programs stored in computer readable medium may be executed by one or more processors to: determine an input mode of the virtual input unit; and determine input instructions associated with the first input key based on the input mode. The virtual input unit includes a first input mode and a second input mode; under each input mode, an input key of the virtual input unit corresponds to two or more input instructions, each input instruction having a different priority level.

Further, the computer programs stored in computer readable medium may be executed by one or more processors to: determine that the virtual input unit is in the first input mode; determine that one input instruction under the first input mode is an input instruction to display the first input key in a first display mode; determine a second input instruction under the first input mode is an input instruction to display the first input key in a second display mode; determine that the virtual input unit is in the second input mode; determine that one input instruction under the second input mode is an input instruction to display the first input key in a second display mode; and determine a second input instruction under the first input mode is an input instruction to display the first input key in a first display mode.

Further, the computer programs stored in computer readable medium may be executed by one or more processors to: determine a first input key corresponding to a location of the touch operation and determine an input instruction based on the measured pressure and the first input key.

It should also be understood that, in the various embodiments, the disclosed methods and devices may be implemented in other ways. The devices described above are merely illustrative. For example, the division of the units/modules is only one logical function division. In actual implementation, there may be additional configurations. For example, multiple units or components may be combined, or can be integrated into another system, or some features can be ignored, or not implemented. In addition, the coupling, direct coupling, or communication connection of the components shown or discussed with respect to each other may be indirect coupling or communication connection through some interface, device or unit, and may be electrical, mechanical, or other forms.

The elements described above as separate components may or may not be physically separated, and the elements displayed as units may or may not be physical units. That is, they may be located in one place or distributed over a plurality of network units; and some or all of the units may be selected according to actual needs.

Further, the functional units in the various embodiments may all be integrated in one processing module, each unit may be separately provided as one unit, or two or more units may be integrated in one unit. The integrated unit may be implemented in hardware or a combination of hardware and software.

Those skilled in the art can understand that all or part of the steps can be implemented by program instructions on related hardware, and the program instructions may be stored in a computer-readable storage medium. When executed, the program instructions can realize the steps in the various embodiments. The computer-readable storage medium may include removable storage devices, read-only memory (ROM), random access memory (RAM), magnetic disks, or optical disk, etc., or any appropriate medium suitable for storing the program instructions.

Although the foregoing is detailed description of the present disclosure with reference to specific embodiments, it should be understood that the present disclosure is not limited to the embodiments disclosed. For those skilled in the art, various modifications, alterations, and replacements can be made without departing from the spirit of the present invention, and shall all fall within the scope of the present disclosure according to claims.

What is claimed is:

1. An input method, comprising:
    determining whether a virtual input unit is in a first input mode or a second input mode;
    measuring a pressure of a touch operation upon receiving the touch operation at an input region of the virtual input unit;
    determining whether the measured pressure is higher than a threshold value;
    determining a first input key corresponding to a location of the touch operation at the input region of the virtual input unit;
    determining that the first input key corresponds to a first instruction if the virtual input unit is in the first input mode and the measured pressure is lower than the threshold value, the first instruction causing a character corresponding to the first input key to be displayed in a first display mode;
    determining that the first input key corresponds to a second instruction if the virtual input unit is in the second input mode and the measured pressure is lower than the threshold value, the second instruction causing the character corresponding to the first input key to be displayed in a second display mode;
    determining that the first input key corresponds to the second instruction or a third instruction if the virtual input unit is in the first input mode and the measured pressure equals to or is higher than the threshold value, the third instruction causing execution of a function corresponding to a key combination of a functional key and the character corresponding to the first input key without actuation of the functional key, and the functional key being unrelated to the first input mode or the second input mode; and
    determining that the first input key corresponds to the first instruction or the third instruction if the virtual input unit is in the second input mode and the measured pressure equals to or is higher than the threshold value.

2. The input method according to claim 1, wherein the virtual input unit supports different input modes; and under each input mode, an input key of the virtual input unit corresponds to two or more instructions, each instruction having a different priority level.

3. An input device, comprising:
    a virtual input unit; and
    a processor configured to:

determine whether the virtual input unit is in a first input mode or a second input mode;

measure a pressure of a touch operation upon receiving the touch operation at an input region of the virtual input unit;

determine whether the measured pressure is higher than a threshold value;

determine a first input key corresponding to a location of the touch operation at the input region of the virtual input unit;

determine that the first input key corresponds to a first instruction if the virtual input unit is in the first input mode and the measured pressure is lower than the threshold value, the first instruction causing a character corresponding to the first input key to be displayed in a first display mode;

determine that the first input key corresponds to a second instruction if the virtual input unit is in the second input mode and the measured pressure is lower than the threshold value, the second instruction causing the character corresponding to the first input key to be displayed in a second display mode;

determine that the first input key corresponds to the second instruction or a third instruction if the virtual input unit is in the first input mode and the measured pressure equals to or is higher than the threshold value, the third instruction causing executing of a function corresponding to a key combination of a functional key and the character corresponding to the first input key without actuation of the functional key, and the functional key being unrelated to the first input mode or the second input mode; and determine that the first input key corresponds to the first instruction or the third instruction if the virtual input unit is in the second input mode and the measured pressure equals to or is higher than the threshold value.

4. The input device according to claim 3, wherein the virtual input unit supports different input modes; and under each input mode, an input key of the virtual input unit corresponds to two or more instructions, each instruction having a different priority level.

5. A non-transitory computer-readable medium including contents that are configured to cause a computing system to receive input by performing a method comprising:

determining whether a virtual input unit is in a first input mode or a second input mode;

measuring a pressure of a touch operation upon receiving the touch operation at an input region of the virtual input unit;

determining whether the measured pressure is higher than a threshold value;

determining a first input key corresponding to a location of the touch operation at the input region of the virtual input unit;

determining that the first input key corresponds to a first instruction if the virtual input unit is in the first input mode and the measured pressure is lower than the threshold value, the first instruction causing a character corresponding to the first input key to be displayed in a first display mode;

determining that the first input key corresponds to a second instruction if the virtual input unit is in the second input mode and the measured pressure is lower than the threshold value, the second instruction causing the character corresponding to the first input key to be displayed in a second display mode;

determining that the first input key corresponds to the second instruction or a third instruction if the virtual input unit is in the first input mode and the measured pressure equals to or is higher than the threshold value, the third instruction causing execution of a function corresponding to a key combination of a functional key and the character corresponding to the first input key without actuation of the functional key, and the functional key being unrelated to the first input mode or the second input mode; and determining that the first input key corresponds to the first instruction or the third instruction if the virtual input unit is in the second input mode and the measured pressure equals to or is higher than the threshold value.

6. The non-transitory computer-readable medium according to claim 5, wherein the virtual input unit supports different input modes; and under each input mode, an input key of the virtual input unit corresponds to two or more instructions, each instruction having a different priority level.

7. The input method according to claim 1, wherein the third instruction causes execution of a function corresponding to a key combination of a Ctrl key and the character corresponding to the first input key without actuation of the Ctrl key.

* * * * *